(No Model.) 3 Sheets—Sheet 2.

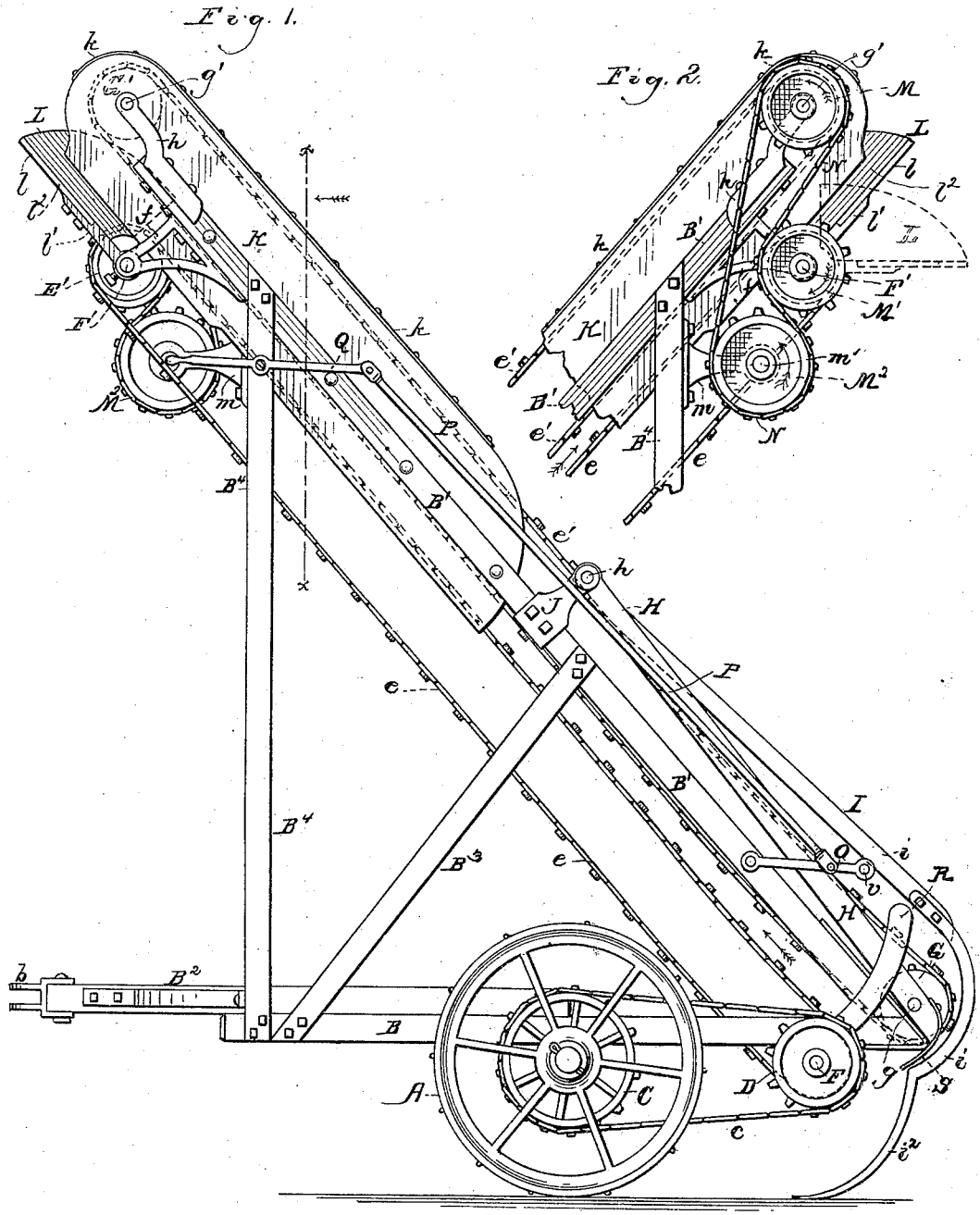

M. BECK.
HAY RAKING AND LOADING MACHINE.

No. 283,746. Patented Aug. 28, 1883.

Witnesses.

Inventor.
Marshall Beck.
By Geo. W. Le Vin.
his Attorney.

(No Model.) 3 Sheets—Sheet 3.
M. BECK.
HAY RAKING AND LOADING MACHINE.
No. 283,746. Patented Aug. 28, 1883.
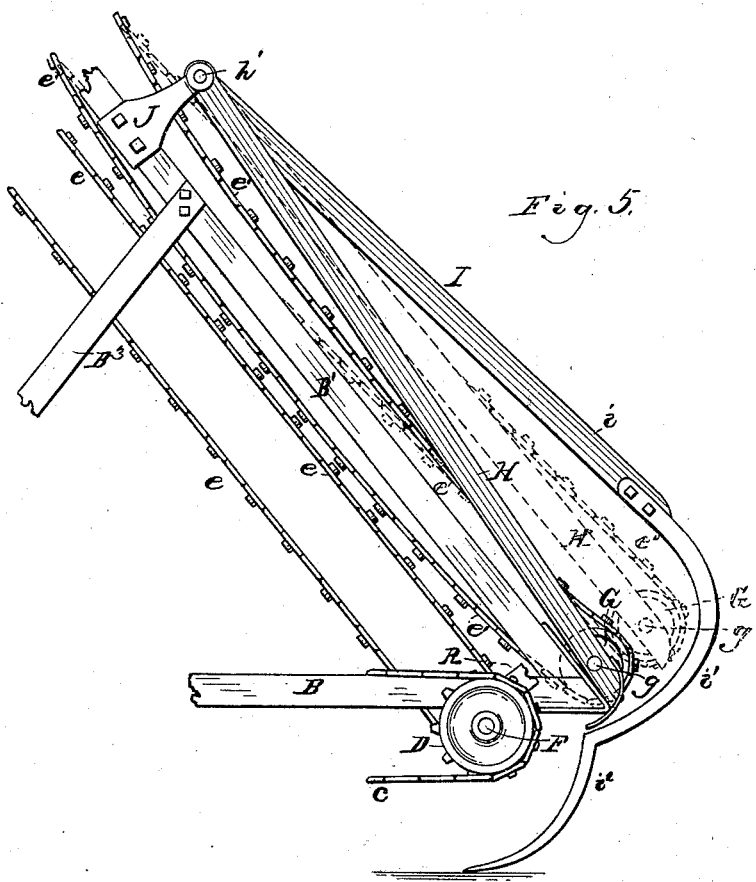
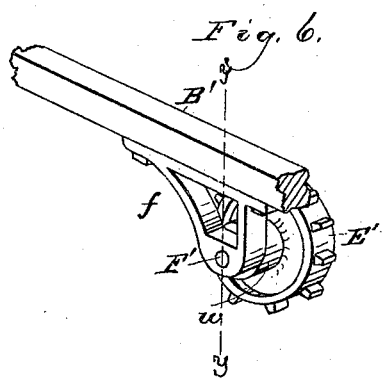
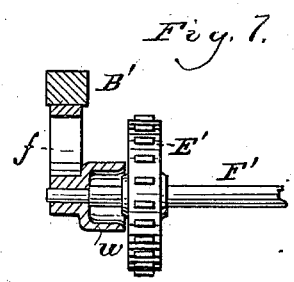
Witnesses.
Inventor.
Marshall Beck.
By Geo. W. Le Vin.
his Attorney.

UNITED STATES PATENT OFFICE.

MARSHALL BECK, OF CHICAGO, ILLINOIS, ASSIGNOR OF TWO-THIRDS TO ERVIN HOPKINS, JR., AND GEORGE W. LE VIN, OF SAME PLACE, LEWIS I. BECK AND HARRY E. BECK, OF CLEAR CREEK, ILLINOIS, AND HARRISON W. BECK, OF INDIANOLA, KANSAS.

HAY RAKING AND LOADING MACHINE.

SPECIFICATION forming part of Letters Patent No. 283,746, dated August 28, 1883.

Application filed December 11, 1882. (No model.)

*To all whom it may concern:*

Be it known that I, MARSHALL BECK, a citizen of the United States, residing at Chicago, in the county of Cook and State of Illinois, have invented certain new and useful Improvements in Hay Raking and Loading Machines, of which the following is a clear, full, and exact specification.

My invention relates to that class of machines in which endless aprons, one operating above the other, are employed in conjunction with rake-teeth for gathering, receiving, and elevating hay from the ground, and has for its object to provide the "take-up" part of the elevating mechanism with self-adjusting means, whereby it will instantaneously adapt itself to irregular conditions of the hay to be elevated, acting with the same degree of reliability in thin or heavy hay or upon the swath or windrow as the emergency of the case may require, together with certain other essential improvements, all of which are hereinafter fully described, and shown in the accompanying drawings, in which—

Figure 3:
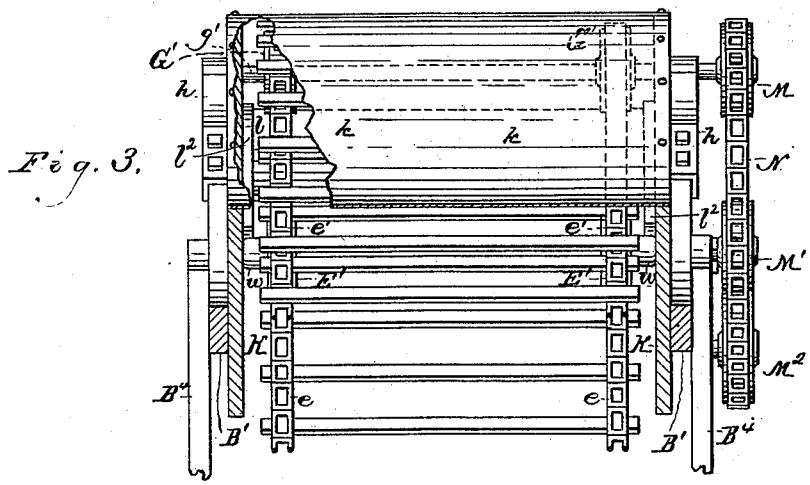
Figure 4:
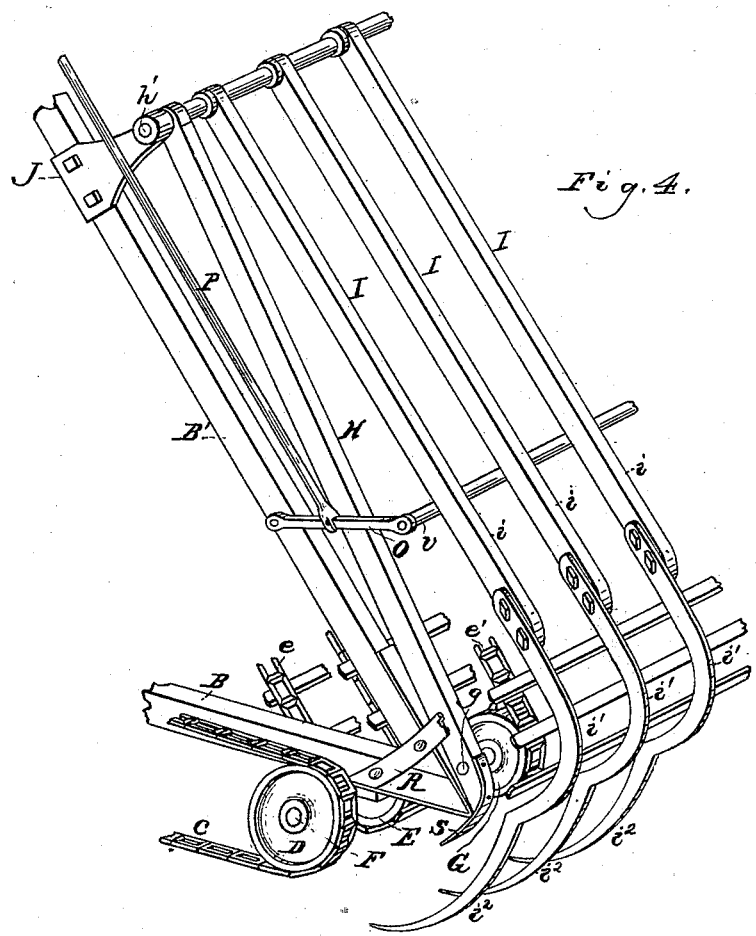

Figure 1 is a side elevation; Fig. 2, a side detail of the upper part of the machine, showing the manner of conveying motion to the upper or overlying apron and the action of and various positions which the delivery-board is capable of occupying; Fig. 3, a section of the upper part of the machine, taken on the line $x\ x$ of Fig. 1, looking in the direction indicated by the arrow; Fig. 4, a perspective of the lower part of the machine, particularly showing the self-adjusting mechanism of the upper apron and the arrangement and construction of the rake-teeth; Fig. 5, side detail of the lower part of the machine, showing the action of the self-adjusting mechanism; Fig. 6, perspective detail of shaft-fender; Fig. 7, section of shaft-fender taken on line $y\ y$ of Fig. 6.

The frame B B' B³ B⁴ is supported by the ground-wheels A A, one only of which is shown in the drawings, and which carries the sprocket-wheel C, over which works the endless chain $c$, which in turn works over the sprocket-wheel D, which is fixed to the shaft F, carrying sprocket-wheels E E, and supported in suitable bearings attached to the main frame-timbers B B. At the under side of the upper end of the inclined timbers B' B' the bearings $f\ f$ support the shaft F', which carries sprocket-wheels E' E', over which and the sprocket-wheels E E (at the lower end of the machine) the slatted endless apron $e$ works. The bearings $h\ h$, on the upper side of the upper end of the inclined timbers B' B', support the shaft $g'$, which carries sprocket-wheels G' G'. Near the middle of the length of the inclined timbers B' B' the bearings J J support a shaft, $h'$, to which is hinged the arms H H, the lower ends of which operate as bearings for the shaft $g$, which carries sprocket-wheels G G, over which and the wheels G' G' the slatted endless apron $e'$ works. The shaft $h'$, to which the arms H H are hinged, likewise carries the rake-teeth I, which are similarly attached thereto, as particularly shown in Fig. 5.

To the inside of the inclined timbers B' B' are fastened side boards, K K, to the upper edges of which is buttoned or otherwise fastened the wind-fender $k$, preferably of canvas, and, as shown in Figs. 1, 2, extending from a point near the middle of the length of the inclined timbers B' B' to a point at or beyond the center of the curve described by the apron $e$ in working around the wheels G' G'.

Adjustably connected to the shaft F' (at the upper end of the lower apron, $e$,) are iron arms $l'\ l'$, which are securely fastened to a board, $l$, provided with side fenders, $l^2\ l^2$, the whole forming a delivery mechanism, L, for guiding the discharged hay from the aprons to the wagon.

To the outer ends of the shafts $g'$ F' (at the upper end of the machine) are fixed sprocket-wheels M M', and below the wheel M' is located a third wheel, M², which is an idler supported by a stud, $m'$, which is a part of the bracket-bearing $m$, fastened to the upright frame-timber B⁴. Around such wheels, as particularly shown in Fig. 2, works the endless chain N, which is the means employed for actuating the upper apron, $e'$, and driving the same in a reverse direction to the underlying apron $e$.

At the rear ends of the main frame-timbers

B B are fastened the uprights R R, which operate as lateral guides for the arms H H, which carry the shaft $g$. The curved fenders S S, at the lower ends of the arms H H, are provided for the purpose of preventing the hay from working in between the frame timbers B' B' and the arms H H when the latter have moved from their normal position. (Shown in Figs. 1 and 4.)

The rake-teeth I are of a construction stout enough to overcome anything approximating to a spring in the material of which they are composed, it being the fact that to insure a positive take up of the hay from the ground and its delivery to the aprons, the entirety of the tooth should be rigid, except in so far as its vibratory action on the shaft $h'$ is concerned, when passing over inequalities of the ground. Therefore, the lower portion of the tooth, composed of the parts $i'$ $i^2$, is preferably made of wrought-iron, which is bolted or riveted to the long upper portion, $i$, which is preferably made of wood. The upper or hinged end of the tooth occupying a position considerably in advance of the extreme lower point of the part $i^2$, a hook action is given to such point, it being drawn under the hay, which readily climbs up the incline of part $i^2$ until it reaches the point from which it is taken by the aprons. The hook shape of the tooth, the manner of its hinged connection with the shaft $h'$, and consequent hook action, obviates the necessity for employing a spring for holding it to its work, its weight being sufficient for practical work under all conditions of the ground or hay. As is shown in Fig. 4, each tooth has an action upon the shaft $h'$ independent of its fellow, their extreme lower points always resting upon the ground except when raised from such working position by the lifting mechanism, which is herein shown to consist of the arms O O, pivoted to the frame-timbers B' B', and carrying rod $v$, connecting-rods P P, and levers Q Q, pivoted to the upright timbers B$^4$ B$^4$, for which any other suitable lifting mechanism may be substituted.

When the machine is at work, the lifting-rod $v$ is dropped to and occupies a position several inches below the part $i$ of the tooth, the tooth thereby having a falling and rising range of action equal to such distance, which admits of their raking-points adapting themselves to undulations of the ground, hay being removed from a dead-furrow as effectually as from level meadow, the position of the lifting-rod, which likewise operates as a stop, being sufficiently high above the apron $e'$ as will prevent the teeth from coming in contact therewith.

In Figs. 6 and 7 is shown a fender, the use of which is to prevent the hay which may overhang the apron $e$ from wrapping around the revolving shafts F F'. The cup or cylinder $w$ is an extension of the bearing-bracket $f$, and works around the revolving shaft F' and close to the apron carrying sprocket-wheel E'.

The pole B$^2$, Fig. 1, is the means by which the machine is attached to the rear of the wagon which carries the elevated hay.

The action of the machine is as follows: The lower apron, $e$, being put in motion by means of the main sprocket-wheel C, chain $c$, and sprocket-wheel D, fixed to shaft F, the wheel M', Fig. 2, fixed to shaft F', which is revolved by said apron, drives the chain N, against which it works, upwardly, thus actuating the idler M$^2$ and wheel M, shaft $g'$, and apron $e'$ in the direction indicated by the arrow shown on wheels M, M', and M$^2$. The lower or take-up ends of the aprons, when in their normal positions, are arranged to stand about two inches apart, which will readily admit of their taking hold of and elevating hay of ordinary bulk raked by the teeth from the swath; but in working over the windrow, or in hay of irregular bulk, where greater take-up capacity is necessary, the apron $e'$, held by the hinged arms H H, yields upwardly, as shown by the dotted lines in Fig. 5, sufficiently far to accommodate or admit such increased bulk between the aprons. In its normal position the apron $e'$ is allowed to slightly sag; but when yielding upwardly is tightened, (also indicated by dotted lines in Fig. 5,) which has the effect of drawing it down to its original position when relieved of the bulk of hay to which it has responded.

The boards K K, extending above the upper line of the upper apron, $e'$, and below the upper line of the lower apron, $e$, break the effect of side winds, while the canvas fender $k$, attached thereto and located in the rear and around the upper end of the upper apron, as shown in Figs. 1, 2, 3, effectually breaks the action of any head-winds which would otherwise seriously interfere with the delivery of the hay. The side fenders, $l^2$ $l^2$, of the delivery mechanism L break the action of side winds upon the hay while passing from the aprons over the delivery-board $l$ to the wagon, such side fenders working inside of the boards K K, as particularly shown in Figs. 1, 2.

I am aware that a rake-tooth having a configuration somewhat like the parts $i'$ $i^2$, but essentially differing from the more important details of construction and action of the tooth herein described and shown, has been heretofore employed. I therefore do not claim the same broadly.

What I do claim as my invention, and desire to secure by Letters Patent, is—

1. In a hay raking and loading machine, the combination and arrangement of the rake-teeth I, composed of the parts $i$ $i'$ $i^2$, and hinged to the shaft $h'$, with the aprons $e$ $e'$, the latter provided at its lower end with a self-adjusting mechanism composed of the vibrating arms H H, hinged to said shaft $h'$, substantially as and for the purpose described.

2. In a hay raking and loading machine, the combination and arrangement of the rake-teeth I, composed of the parts $i$ $i'$ $i^2$, hinged to a shaft, $h'$, aprons $e$ $e'$, the latter provided at its lower end with hinged vibrating arms H H, and upper apron-driving mechanism composed of chain-wheel M, fixed to shaft $g'$, chain-wheel M', fixed to shaft F', idle chain-wheel M², and chain N, substantially as and for the purpose described.

3. In a hay raking and loading machine, the combination and arrangement of the rake-teeth I, composed of the parts $i\ i'\ i^2$, and hinged to a shaft, $h'$, aprons $e\ e'$, the latter provided at its lower end with hinged vibrating arms H H, upper apron-driving mechanism composed of chain-wheels M M' M², and chain N, side boards, K K, wind-fender $k$, and delivery mechanism L, substantially as and for the purpose described.

MARSHALL BECK.

Witnesses:
E. HOPKINS, Jr.,
GEO. W. LE VIN.